United States Patent
Reuter et al.

(10) Patent No.: US 8,539,611 B1
(45) Date of Patent: Sep. 17, 2013

(54) SCANNED PROBE MICROSCOPY (SPM) PROBE HAVING ANGLED TIP

(75) Inventors: Mark C. Reuter, Montrose, NY (US); Brian A. Bryce, Ithaca, NY (US); Bojan R. Ilic, Ithaca, NY (US); Sandip Tiwari, Ithaca, NY (US)

(73) Assignees: International Business Machines Corporation, Armonk, NY (US); Cornell University, Ithaca, NY (US)

( * ) Notice: Subject to any disclaimer, the term of this patent is extended or adjusted under 35 U.S.C. 154(b) by 0 days.

(21) Appl. No.: 13/547,378

(22) Filed: Jul. 12, 2012

Related U.S. Application Data

(63) Continuation of application No. 13/539,778, filed on Jul. 2, 2012.

(51) Int. Cl.
*G01Q 60/38* (2010.01)
*H01L 21/306* (2006.01)
*B82Y 40/00* (2011.01)

(52) U.S. Cl.
USPC .......... 850/32; 850/33; 850/40; 850/45; 850/60; 850/29

(58) Field of Classification Search
USPC .............. 850/32, 33, 40, 45, 60, 29
See application file for complete search history.

(56) References Cited

U.S. PATENT DOCUMENTS

| | | | |
|---|---|---|---|
| 6,066,265 A * | 5/2000 | Galvin et al. | 216/2 |
| 6,864,481 B2 | 3/2005 | Kaito et al. | |
| 7,572,300 B2 | 8/2009 | Cohen et al. | |
| 7,735,147 B2 | 6/2010 | Jin et al. | |
| 8,020,216 B2 | 9/2011 | Jin | |
| 8,321,961 B2 * | 11/2012 | Cohen et al. | 850/60 |
| 2007/0186627 A1 | 8/2007 | Yi et al. | |

OTHER PUBLICATIONS

T. R. Albrecht et al., "Microfabrication of cantilever styli for the atomic force microscope," J. Vac. Sci. Technol., vol. A8, 1990, pp. 3386-3396.

D. S. Engstrom et al., "High Throughput Nanofabrication of Silicon Nanowire and Carbon Nanotube Tips on AFM Probes by Stencil-Deposited Catalysts," Nano Letters, vol. 11, 2011, pp. 1568-1574.

R. B. Marcus et al., "Formation of silicon tips with <1 nm radius," Appl. Phys. Lett., vol. 56, 1990, pp. 236-238.

R. S. Wagner et al., "Vapor-liquid-solid mechanism of single crystal growth," Appl. Phys. Lett., vol. 4, 1964, pp. 89-90.

Q. Ye et al., "Large-Scale Fabrication of Carbon Nanotube Probe Tips for Atomic Force Microscopy Critical Dimension Imaging Applications," Nano Letters, vol. 4, 2004, pp. 1301-1308.

* cited by examiner

*Primary Examiner* — Nikita Wells
(74) *Attorney, Agent, or Firm* — Cantor Colburn LLP; Vazken Alexanian

(57) ABSTRACT

A method of creating a probe for scanned probe microscopy is disclosed. The method includes providing a wafer having a support wafer layer and a device layer. The method includes masking the wafer with a masking layer. The method includes removing a portion of the masking layer at the device layer. The method includes etching the wafer along the portion of the masking layer that has been removed to create a crystal facet surface that is oriented at a tilt angle. The method includes epitaxially growing a tip along the crystal facet surface.

15 Claims, 9 Drawing Sheets

SCANNED PROBE MICROSCOPY (SPM) PROBE HAVING ANGLED TIP

CROSS-REFERENCE TO RELATED APPLICATIONS

This application is a continuation of U.S. application Ser. No. 13/539,778, filed Jul. 2, 2012. The disclosure of the above-referenced application is hereby incorporated in its entirety.

BACKGROUND

The present invention relates to scanned probe microscopy (SPM), and more specifically, to a SPM probe having a tip projecting from a crystal facet surface.

Atomic force microscopy (AFM) is a branch of SPM that creates images of sample surfaces (e.g., the surface of a semiconductor device) using an AFM probe. AFM probes include a cantilever beam and a tip extending from the cantilever beam. The tip is a relatively thin rod or nanowire. The tip of the cantilever beam may be used to image high aspect features (e.g., trenches or wells) located along a sample surface. A high aspect feature generally has a relatively narrow and deep. The depth that an AFM probe may reach into a deep feature depends on the angle or orientation of the tip relative to the sample surface. If the tip is oriented generally perpendicular to the sample surface, this typically allows for the tip to reach into the deepest portions of the feature. However, the cantilever beam is usually positioned at an angle relative to the sample surface. Thus, the tip is also positioned at an angle relative to the sample surface. As a result, sometimes the tip may not be able to reach into the deepest portions of the features.

In one approach, the AFM probe may be tilt corrected for high aspect ratio probing, where the angle of the cantilever beam relative to the sample surface is adjusted. In another approach, tips having a relatively high aspect ratio are provided. These high aspect ratio tips may be, for example, carbon nanotubes (CNT) tips, carbon fiber tips, and focus ion beam (FIB) milled tips. However, these tips are limited in manufacturability and are relatively costly to fabricate. FIB milled tips may be shaped and oriented at a specific angle. However, the amount of angling of the FIB milled tip with respect to the cantilever beam may be limited by material constraints as well as FIB milling effects such as re-deposition.

SUMMARY

According to one embodiment of the present invention, a method of creating a probe for scanned probe microscopy is provided. The method includes providing a wafer having a support wafer layer and a device layer. The method includes masking the wafer with a masking layer. The method includes removing a portion of the masking layer at the device layer. The method includes etching the wafer along the portion of the masking layer that has been removed to create a crystal facet surface that is oriented at a tilt angle. The method includes epitaxially growing a tip along the crystal facet surface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 8A is a side view and FIG. 8B is a top view;

FIG. 9A is a side view and FIG. 9B is a top view;

FIG. 10A is a side view and FIG. 10B is a top view;

FIG. 11A is a side view and FIG. 11B is a top view;

FIG. 12A is a side view and FIG. 12B is a top view;

FIG. 13A is a side view and FIG. 13B is a bottom view;

FIG. 14A is a side view and FIG. 14B is a top view;

FIG. 15A is a side view and FIG. 15B is a top view;

FIG. 16A is a side view and FIG. 16B is a top view;

FIG. 17A is a side view and FIG. 17B is a top view;

FIG. 18A is a side view and FIG. 18B is a top view;

FIG. 21A is a side view and FIG. 21B is a top view;

FIG. 22A is a side view and FIG. 22B is a top view;

DETAILED DESCRIPTION

Exemplary embodiments disclose a scanned probe microscopy (SPM) probe that includes a tip that is angled with respect to a cantilever beam. In one embodiment, the tip is positioned generally orthogonal to a crystal facet surface of the cantilever beam, and is oriented to provide tilt correction for the SPM probe. Tilt correction will allow for the tip to be positioned generally perpendicular to the sample surface or at another desirable angle. For a perpendicular correction, during scanning the tip may be able to reach into relatively deep portions of trenches, wells or other features located along the sample surface. For another angle desired sidewall or other features may be probes. The tip of the SPM probe as disclosed in exemplary embodiments may also be relatively less complex to fabricate when compared to some other types of angled tips that currently available. The tip may also be thinned (e.g., decreased in diameter) to increase the aspect ratio of the tip. A higher aspect ratio may also facilitate scanning of the sample surface, as a tip with a relatively high aspect ratio may be able to reach into relatively deep trenches more easily.

Figure 1:
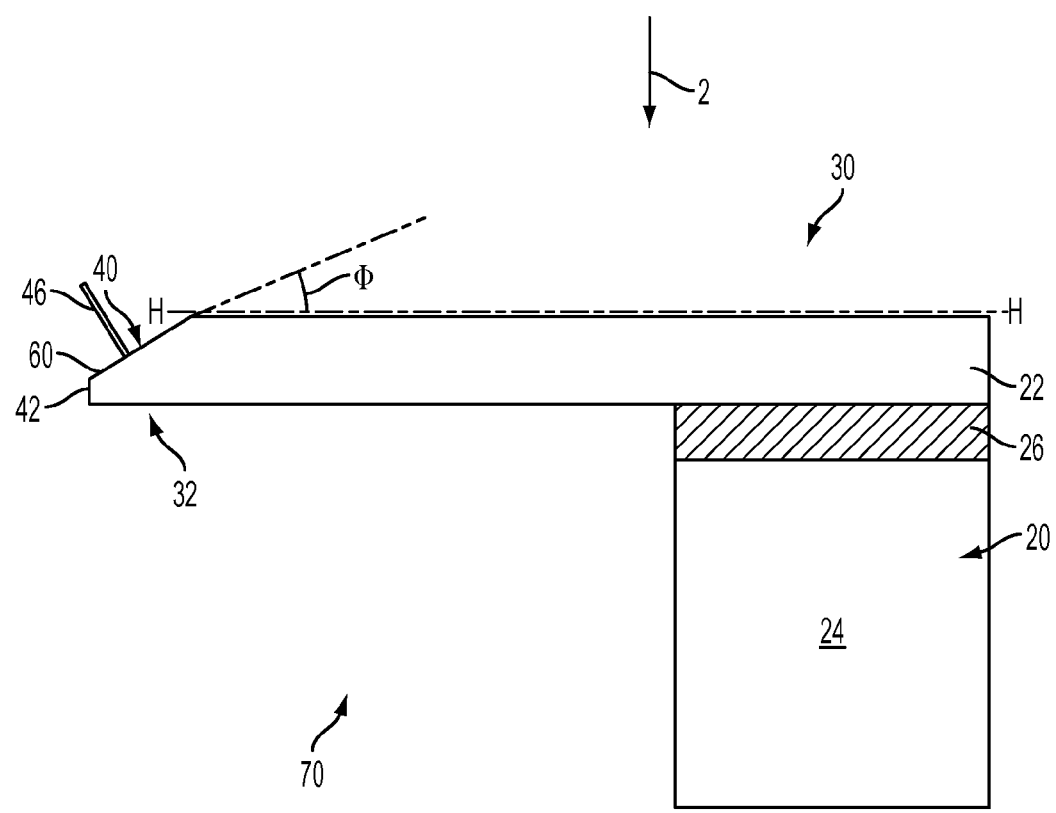
FIG. 1 is an illustration of an exemplary scanned probe microscopy (SPM) probe according to one embodiment of the invention.

FIG. 1 is an illustration of an exemplary scanned probe microscopy (SPM) probe 10. In one embodiment, the SPM probe 10 may be an atomic force microscopy (AFM) probe. For example, in one embodiment, the SPM probe 10 may be used in tapping-mode AFM microscopy. However it is to be understood that the SPM probe 10 may be used in other types of scanned probe microscopy applications as well. The SPM probe 10 includes a handling port 20 and a cantilever beam 22, where the probe 10 is held by the handling port 20. The handling port 20 is generally constructed from a support wafer layer 24, a buried oxide (BOX) layer 26, and a device layer 22.

The support wafer layer 24 is mechanical and may be constructed from any chemically compatible and thermally stable material, such as, for example, silicon. The BOX layer 26 may be constructed from an oxide such as silicon dioxide ($SiO_2$). The cantilever beam 22 (which is also referred to as the device layer) may be constructed from a semiconductor material such as, for example, a single-crystal silicon (e.g., referred to as monocrystalline silicon, single-crystal Si, or mono-Si) or single-crystal germanium. Single-crystal silicon and single-crystal germanium generally allow for homoepitaxial growth of a nanowire or tip 46. For hetroepitaxial growth the cantilever beam 22 may be constructed from any crystalline material.

Figure 2:
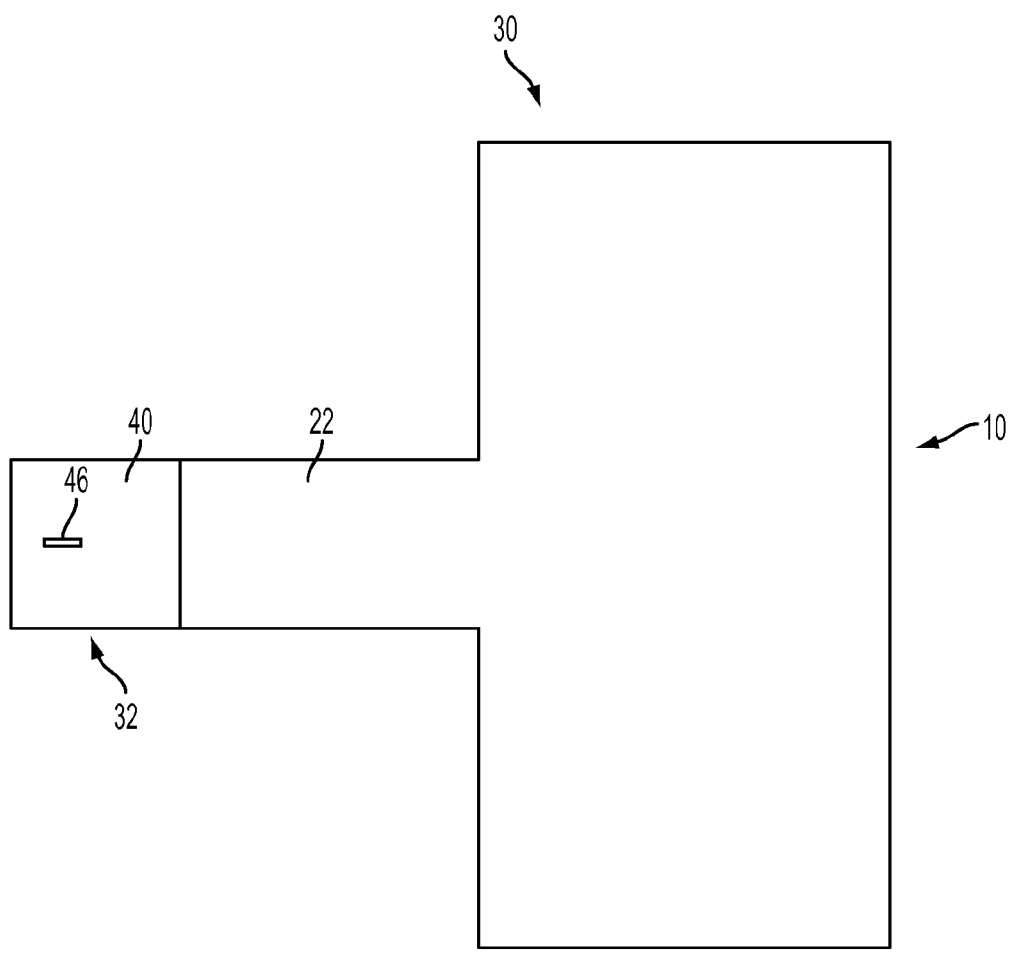
FIG. 2 is a bottom view of the SPM probe shown in FIG. 1 taken with respect to an arrow 2.

The cantilever beam 22 extends along a generally horizontal axis H—H. FIG. 2 is a bottom view of the SPM probe 10 taken with respect to an arrow 2 (shown in FIG. 1). Referring to both FIGS. 1-2, the cantilever beam 22 includes a proximate or first end portion 30 and a distal or second end portion 32. The first end portion 30 is proximate to the handling port 20, and is used as an anchor to attach the cantilever beam 22 to the handling port 20. The second end 32 is positioned distally from the handling port 20, and includes a crystal facet surface 40 and a chamfered end 42 (shown in FIG. 1). The nanowire or tip 46 is positioned along and projects outwardly from the crystal facet surface 40. The tip 46 may be positioned generally orthogonal with respect to the crystal facet surface 40. Specifically, if the cantilever beam 22 is constructed from single-crystal silicon or single-crystal germanium, then the tip 46 may be homoepitaxially grown in a direction that is generally orthogonal to the crystal facet surface 40.

In one embodiment, the crystal facet surface 40 may be oriented in the {111} crystalline plane of the semiconductor material. Alternatively, in another embodiment, the crystal facet surface may be oriented in another direction such as the {112} crystalline plane or the {110} crystalline plane of the semiconductor material as well. However, in some embodiments, the crystal facet surface 40 may need to be oriented along the {111} crystalline plane, depending on a diameter or thickness of the tip 46 (e.g., relatively thicker tips 46 are generally grown on the {111} crystalline plane. For silicon nanowires with diameters less than 10 nm, these types of nanowires prefer to grow in the {110} direction. Silicon nanowires from 10-20 nm typically grow in the {111}, {112} and {110} directions. As the wire diameter increases the {111} direction becomes dominant.

Figure 3:
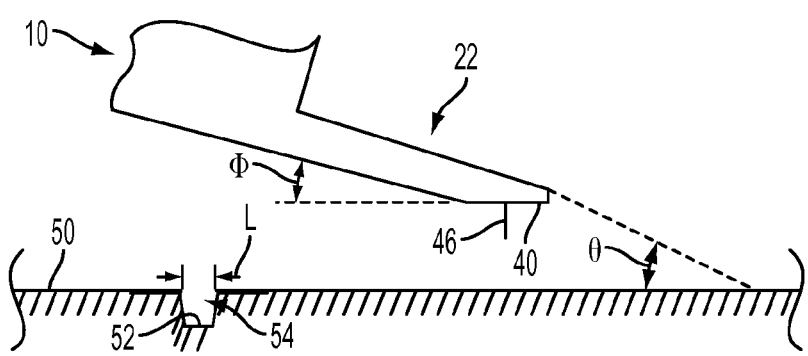
FIG. 3 is an illustration of the SPM probe in FIG. 1 during imaging of a sample surface.

The crystal facet surface 40 is oriented at a tilt angle φ with respect to the horizontal axis H-H of the cantilever beam 22. In one embodiment, the tilt angle φ may be selected based on a tilt correction factor. Referring now to FIG. 3, the tilt correction factor is based on an angled position of the cantilever beam 22 in an SFM machine (not shown) during imaging of a sample surface 50. The sample surface 50 may be, for example, a surface of a semiconductor device.

For example, in one embodiment, the cantilever beam 22 may be positioned at an angle θ with respect to the sample surface 50 during imaging. In one embodiment, the angle θ may be about 13°, however it is understood that the cantilever beam 22 may be positioned with respect to the sample surface 50 at other angles as well. The tilt angle Φ is generally the same as the angle θ. Thus, the crystal facet surface 40 is generally parallel with the sample surface 50. As a result, if the tip 46 positioned generally orthogonal with respect to the crystal facet surface 40, then the tip 46 will also be positioned generally perpendicular to the sample surface 50 during imaging of the sample surface 50. Orienting the tip 46 generally perpendicular to the sample surface 50 may allow for the tip 46 to reach into the deepest portions 52 (e.g., the bottom surface) of a trench 54 located along the sample surface 50.

Referring back to FIG. 1, the tip 46 is epitaxially grown by first placing a metal catalyst along a surface 60 of the crystal facet structure 40. Some examples of a metal catalyst may include, but are not limited to, gold (Au), aluminum (Al), palladium (Pd), titanium (Ti), nickel (Ni), silver (Ag), copper (Cu), iron (Fe), gallium (Ga), indium (In), platinum (Pt), and zinc (Zn). Alloys of two metals may also be used. In one embodiment, gold may be selected as the metal catalyst due to gold's relatively simple phase diagram and ease of handling.

A droplet or dot 64 (shown in FIGS. 15A-15B) of the catalyst metal is created along the crystal facet surface 40. For example, in one approach, the metal catalyst may be deposited on the crystal facet surface 40 in an evaporation chamber (e.g., using a thermal or e-beam evaporator). Although evaporation is discussed, it is understood that other approaches may be used as well to deposit the metal catalyst such as, for example, direct current (DC) or radio frequency (RF) sputtering. In one embodiment, the catalyst dot 64 may be grown to a thickness of about 50 nm to about 100 nm.

After creation of the catalyst dot 46, a single, isolated nanowire or tip 46 may be epitaxially grown along the crystal facet surface 40 using a variety of approaches such as, for example a vapor-liquid-solid (VLS) mechanism or a vapor-solid-solid (VSS) mechanism. For example, in one approach the tip 46 is grown by placing the catalyst dot 64 in a chemical vapor deposition (CVD) chamber (not shown), and annealing the catalyst dot 64 for a predetermined amount of time (e.g., generally between about 5 and 15 minutes). Then, a precursor such as, for example, silicon tetrachloride ($SiCl_4$), silane ($SiH_4$) or disilane ($Si_2H_6$) may be introduced into the CVD chamber. The CVD chamber may then be pressurized, where the tip 46 may nucleate and grow for a predetermined amount of time. The predetermined amount of time will determine how long the tip 46 grows. In general, the predetermined amount of time generally ranges between about 10 to about 30 minutes for a reactor pressurized to 250 mTorr with $SiH_4$ at a temperature of about 600° C.

Various chemical vapor deposition processes may be used to grow the tip 46 such as, for example, low-pressure chemical vapor deposition (LPCVD), plasma enhanced chemical vapor deposition (PECVD), high density plasma chemical vapor deposition (HDPCVD), or ultrahigh vacuum chemical vapor deposition (UHVCVD). Although chemical vapor deposition is discussed, other types of processes for growing the tip 46 are also available such as, for example, molecular beam epitaxy (MBE).

Figure 4:
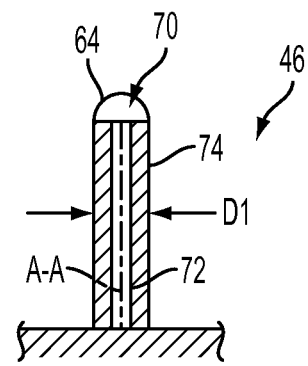
FIG. 4 is an exemplary illustration of a tip of the SPM probe in FIG. 1, prior to thinning.

FIG. 4 is an illustration of the tip 46 after growth. In one embodiment, the resulting tip 46 may have a thickness or a diameter D1 ranging from about 250 nm to about 400 nm. After growth, the tip 46 may be thinned to achieve a higher aspect tip 46. The tip 46 may be thinned based on stiffness requirements. Thinning of the tip 46 is achieved by first removing the catalyst dot 64 positioned on a distal end 70 of the tip 46. In one approach, the dot 64 is removed by a liquid etch solution that is capable of etching the metal catalyst, but not the material that the tip 46 is constructed from. For example, if gold is used as the metal catalyst and the tip 46 is constructed of silicon, then a solution of elemental iodine ($I_2$) and potassium iodide (KI) in water (also known as Lugol's solution) may be used to remove the gold. Alternatively, aqua regia (nitro-hydrochloric acid) may be used as well. In another approach, if the metal catalyst is aluminum and the tip 46 is constructed of silicon, then phosphoric acid, hydrofluoric acid, hydrochloric acid, or tetramethylammonium hydroxide (TMAH) may be used. The tip 46 is now ready to be thinned, thus decreasing the diameter D1.

Figure 5:
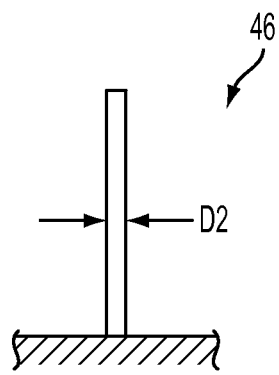
FIG. 5 is an exemplary illustration of the tip of the SPM probe shown in FIG. 4 after thinning.

FIG. 5 is an illustration of the tip 46 after thinning. In one embodiment, after thinning, the tip 46 may have a diameter or thickness D2 of 10 nm to 200 nm, where the second diameter D2 is less than the first diameter D1 (FIG. 4). In one approach, the tip 46 may be thinned by combination of an oxidization process, which is followed by vapor hydrofluoric etching. For example, with reference to both FIGS. 4-5 in one approach, the tip 46 may be placed in a dry oxygen furnace (e.g., using molecular oxygen) or wet oxygen furnace (e.g., using ultra high purity water vapor) to produce a layer of oxide 72 (usually silicon dioxide) that starts along an outer surface 74 of the tip 46 (shown in FIG. 4), and grows inwardly towards the center axis A-A of the tip 46. The layer of oxide 72 may then be removed by exposing the tip 46 to hydrofluoric acid vapor (e.g., in a vapor hydrofluoric chamber). The final diameter D2 of the tip 46 after removal of the layer of oxide may depend on a thickness of the layer of oxide that is grown on outer surface 72 of the tip 46, as well as the initial thickness D1 of the tip 46 (shown in FIG. 4).

Although an oxidation process and vapor hydrofluoric etching are discussed, it is understood that the tip 46 may also be thinned using any isotropic or anisotropic etch configured for the material that the tip 46 is constructed from (e.g., if the tip 46 is constructed of silicon then any isotropic or anisotropic silicon etch may be used). Oxidation combined with vapor hydrofluoric etching may facilitate more precise control over thinning of the tip 46 when compared to some other types of etching processes currently available such as, for example, sulfur hexafluoride ($SF_6$) plasma reactive ion etching or xenon difluoride ($XeF_2$) gas etching.

By thinning the tip 46 to the thickness D2, the aspect ratio of the tip may be increased. A tip with a relatively high aspect ratio may be able to reach into relatively deep trenches more easily. In one illustrative example, if the tip 46 is thinned to the thickness D2 of about 84 nm and has a length of about 8 μm, the tip 46 may be able to reach the bottom surface 52 of the trench 54 (FIG. 3) that has a length L as narrow as about 300 nm and a depth of about 2.05 μm in an atmospheric AFM. In another illustrative example, if the thickness D2 of the tip 46 is about 244 nm, then the tip 46 may be able to reach the bottom surface 52 of the trench 54 (FIG. 3) that has a length L as narrow as about 500 nm in an atmospheric AFM. In one exemplary embodiment employing gold as the metal catalyst, an aspect ratio of at least 100:1 may be achieved; however, it is understood that the aspect ratio may be higher or lower depending on the specific requirements of the tip 46.

Figure 6:
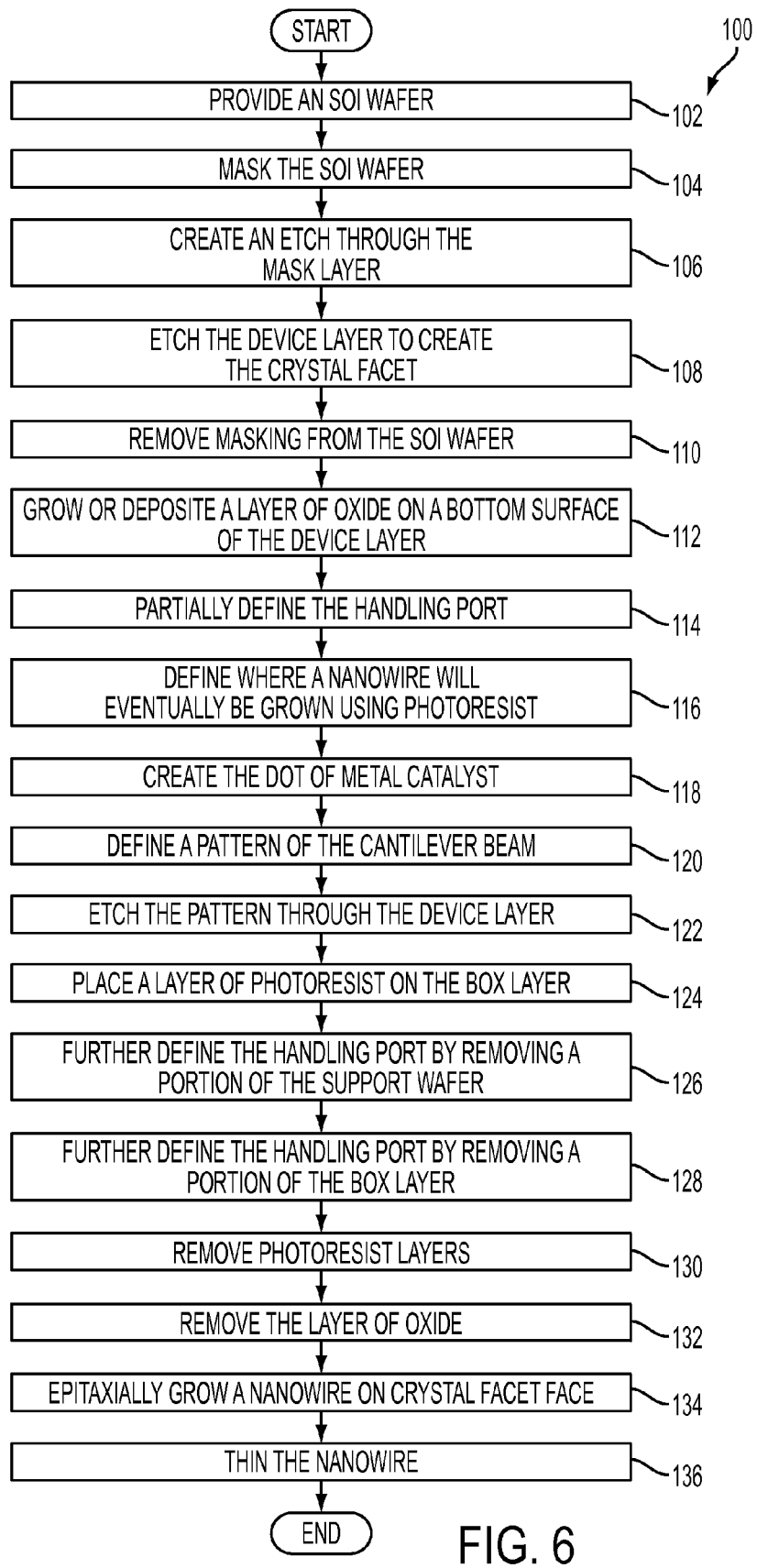
FIG. 6 is a process flow diagram illustrating one exemplary approach of fabricating the SPM probe illustrated in FIG. 1.
Figure 7:
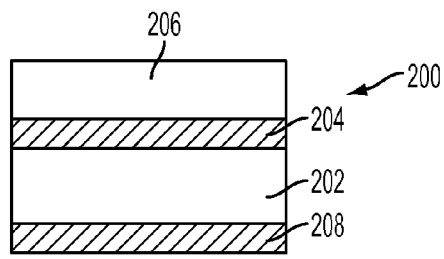
FIG. 7 is an illustration of an exemplary SOI wafer.

A method of creating the SFM probe 10 will now be described. Turning now to FIG. 6, a process flow diagram 100 is illustrated. Referring now to FIGS. 6-7, the method may begin at block 102, where a silicon-on-insulator (SOI) wafer 200 is provided. The SOI wafer 200 includes a support wafer layer 202, a BOX layer 204, a device layer 206, and an oxide layer 208. The oxide layer 208 may typically be silicon dioxide. The BOX layer 204 is located between the device layer 206 and the support wafer 202, and the oxide layer 208 is located below the support wafer 202. In one approach, the oxide layer 208 may be created by a deposition process such as, for example, plasma enhanced chemical vapor deposition (PECVD). Method 100 may then proceed to block 104.

Figure 8A:
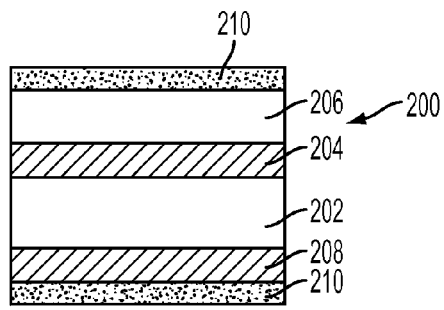
FIGS. 8A-8B is an illustration of the SOI wafer being masked with a masking layer, where
Figure 8B:
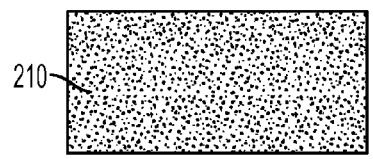

Referring to FIGS. 6 and 8A-8B, in block 104 the SOI wafer 200 is cleaned (e.g., by an RCA clean) to substantially remove contaminants, and is then masked with a masking layer 210 along the device layer 206 and the oxide layer 208. The masking layer 210 may be any material that has a relatively high resistance to an etchant that is used in block 108 (e.g., potassium hydroxide (KOH) solution or tetramethylammonium hydroxide (TMAH)). For example, the masking layer 210 may be a silicon nitride ($Si_3N_4$) layer or a silicon dioxide layer. In one embodiment, the masking layer 210 may be deposited on the SOI wafer 200 using a low-pressure chemical vapor deposition (LPCVD) process. Method 100 may then proceed to block 106.

Figure 9A:
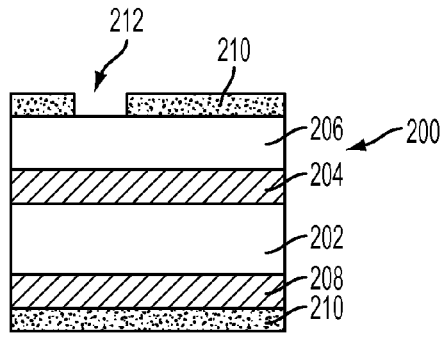
FIGS. 9A-9B are an illustration of the SOI wafer where a portion of the masking layer is removed, where
Figure 9B:
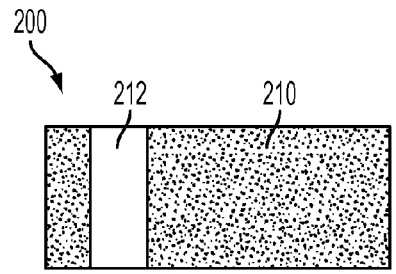

Referring to FIGS. 6 and 9A-9B, in block 106 a portion 212 of the masking layer 210 along the device layer 206 (shown in FIG. 7) is removed. The portion 212 of the masking layer 210 that is removed defines where the crystal facet surface 40 will eventually be created on the cantilever beam 22 (shown in FIGS. 1-3). In one approach, the portion 212 may be created using reactive-ion etching (RIE), which may use fluorocarbon-gases such as, for example, carbon tetrafluoride ($CF_4$). Method 100 may then proceed to block 108.

Figure 10A:
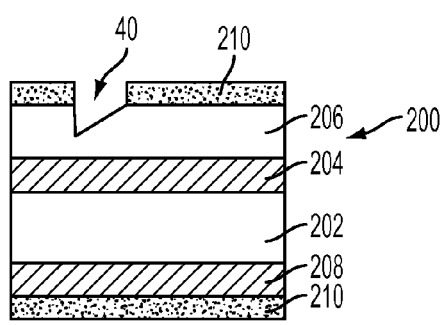
FIGS. 10A-10B are an illustration of the SOI wafer being etched, where
Figure 10B:
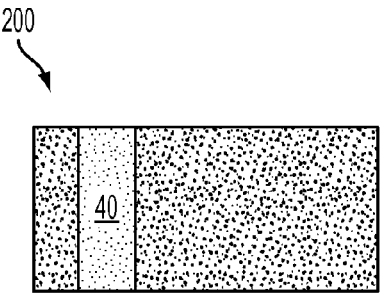

Referring now to FIGS. 6 and 10A-10B, in block 108 the SOI wafer 200 is etched along the portion 212 (shown in FIGS. 9A-9B). The etching creates the crystal facet surface 40. The etching migrates towards the crystalline plane of the crystal facet surface 40. For example, if the crystal facet surface 40 is oriented in the {111} crystalline plane of the device layer 206, then the etching effectively stops on the {111} crystalline plane. In one approach, the SOI wafer 200 may be etched by placing the SOI wafer 200 in heated (e.g., between about 75° C. to about 80° C.) KOH solution. Alternatively, in another embodiment, TMAH may be used instead of potassium hydroxide to create the chemical etch. Method 100 may then proceed to block 110.

Figure 11A:
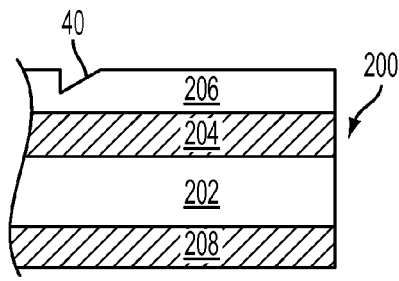
FIGS. 11A-11B are an illustration of the SOI wafer having the masking layer removed, where
Figure 11B:
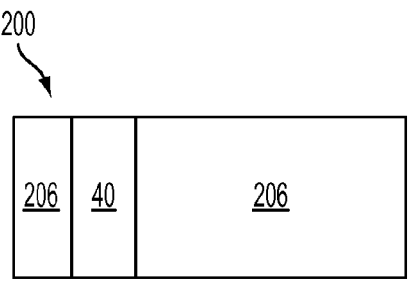

Referring now to FIGS. 6 and 11A-11B, in block 110 the masking layer 210 (shown in FIGS. 10A-10B) is removed. For example, in one approach, if the masking layer 210 is constructed from silicon nitride, then the masking layer 210 may be removed by placing the SOI wafer 200 in heated phosphoric acid ($H_3PO_4$). This leaves the device layer 206 as the top most layer with a recessed well or pit the bottom surface 40 of which is a crystal facet. For example, the bottom surface of the recessed well may be a {111} crystal plane. Method 100 may then proceed to block 112.

Figure 12A:
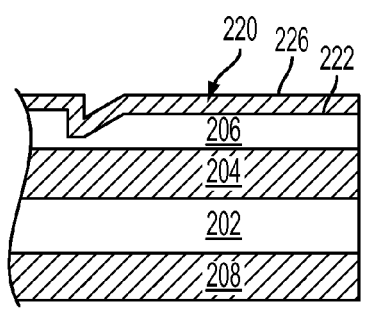
FIGS. 12A-12B are an illustration of the SOI wafer having a layer of oxide added to a top surface, where
Figure 12B:
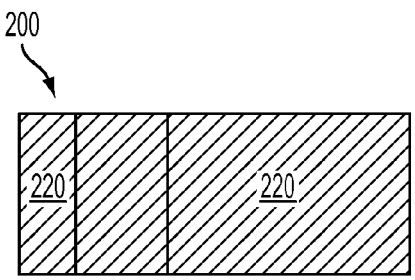

Referring now to FIGS. 6 and 12A-12B, in block 112 the SOI wafer 200 may be cleaned (e.g., by an RCA clean) to remove contaminants. The SOI wafer may then be placed in an oxygen environment to oxidize the SOI wafer 200, which is done to provide a clean surface for growing the tip 46 (shown in FIG. 23). This creates a layer of oxide 220. Alternatively, the layer of oxide 220 may be deposited on the top surface 220 using a deposition processes such as, for example, atomic layer deposition (ALD), molecular layer deposition (MLD), chemical vapor deposition (CVD), low-pressure chemical vapor deposition (LPCVD), plasma enhanced chemical vapor deposition (PECVD), high density plasma chemical vapor deposition (HDPCVD), sub-atmospheric chemical vapor deposition (SACVD), and rapid thermal chemical vapor deposition (RTCVD). Method 100 may then proceed to block 114.

Figure 13A:
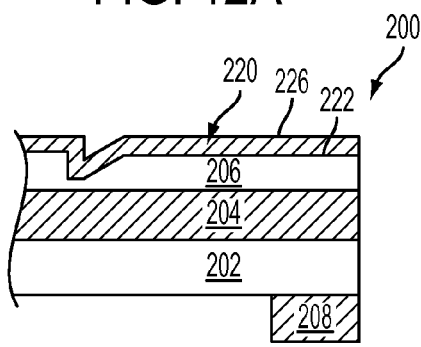
FIGS. 13A-13B are an illustration of the SOI wafer after a handling port is partially defined, where
Figure 13B:
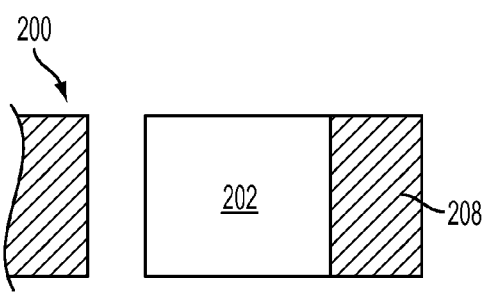

Referring now to FIGS. 6 and 13A-13B, in block 114 the handling port 20 (shown in FIG. 1) is partially defined. Specifically, a top surface 226 of the SOI wafer 200 is coated in a photoresist material (not illustrated). In one exemplary embodiment, SPR 220 may be used as the photoresist, however it is understood that various other types of photoresist may be used as well. Lithography (e.g., contact lithography or stepper lithography, for example) is then performed to define alignment keys or marks along the top surface 226. The keys are then transferred to the oxide layer 220 of the SOI wafer 200 by an etching process such as, for example, fluoroform/oxygen ($CHF_3/O_2$) reactive ion etching. Lithography is then performed along the bottom surface 224 of the SOI wafer 200 to define the handling port 20 (shown in FIG. 1), where a portion of the oxide layer 208 is removed via RIE. Alternatively, in another embodiment, hydrofluoric acid may be used instead to remove a portion of the oxide layer 208 to partially define the handling port 20. The photoresist may then be removed from the SOI wafer 200 using organic solvents. Method 100 may then proceed to block 116.

Figure 14A:
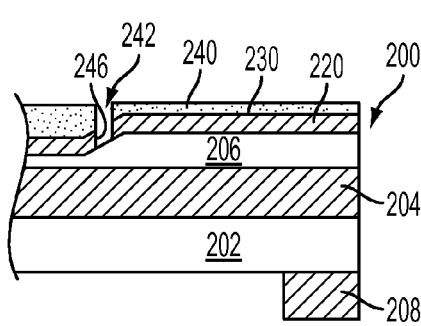
FIGS. 14A-14B are an illustration of the SOI wafer having a recess created in the top oxide layer, where
Figure 14B:
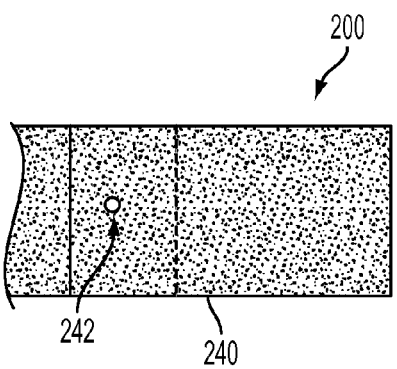

Referring now to FIGS. 6 and 14A-14B, in block 116 a topmost surface 230 of the layer of oxide 220 is coated in a layer of photoresist 240 (e.g., for example, SPR 700), where a circular portion 242 of the photoresist 240 is omitted, and is illustrated as a circle having a diameter of about 1 μm. The circular portion 242 defines where a nanowire (e.g., the tip 46 as illustrated in FIGS. 1-3) will eventually be grown. For example, in one approach, the circular portion 242 of the photoresist 240 is defined using an i-line stepper lithography. The circular portion 242 created by the layer of photoresist 240 is then further defined by etching through a portion of the layer of oxide 220. For example, in one embodiment, reactive-ion etching using fluorocarbon-gases such as, for example, carbon tetrafluoride ($CF_4$) may be used to etch though a portion of the layer of oxide 220. The remaining portion of the layer of oxide 220 may then be removed using, for example, a buffered oxide etch (BOE) solution. This results in a recess 246 though the layer of oxide 220. Method 100 may then proceed to block 118.

Figure 15A:
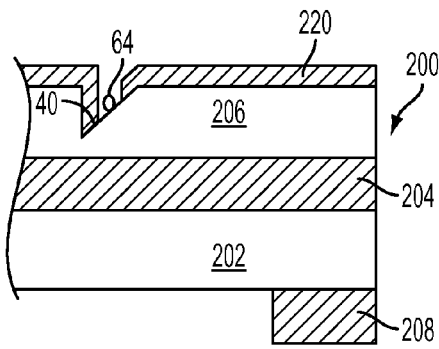
FIGS. 15A-15B are an illustration of a catalyst droplet or dot being created on a crystal facet surface of the SOI wafer, where
Figure 15B:
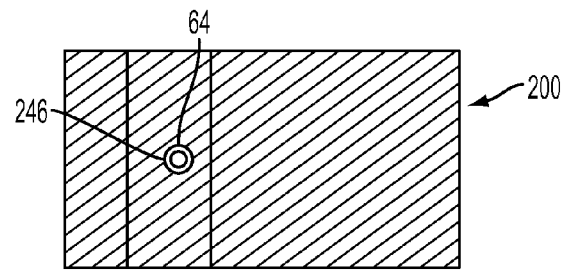

Referring now to FIGS. 6 and 15A-15B, in block 118 the dot 64 of metal catalyst is created along the crystal facet structure 40. In one exemplary approach, the dot 64 of metal catalyst is deposited in an evaporation chamber at a pressure less than about $2 \times 10^{-6}$ Torr, and a metal catalyst such as, for example, gold is evaporated at a rate of 3 angstroms per second. However, it is to be understood that various approaches and metal catalysts exist for creating the dot 64. The dot 64 may be deposited to a thickness of about 50 nm to about 100 nm. The SOI wafer 200 may then be removed from the evaporation chamber. The layer of resist 240 (shown in FIGS. 14A-14B) may be removed. For example, in one embodiment, N-methyl-2-pyrrolidone (NMP) may be used to remove the layer of resist 240. Method 100 may then proceed to block 120.

Figure 16A:
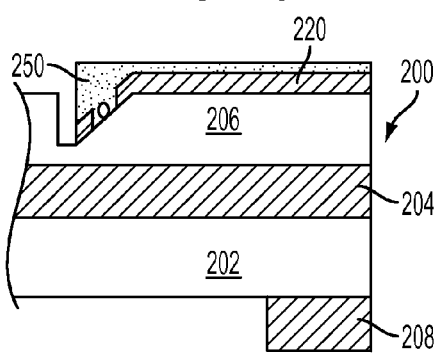
FIGS. 16A-16B are an illustration of the SOI wafer where a pattern of a cantilever beam is created, where
Figure 16B:
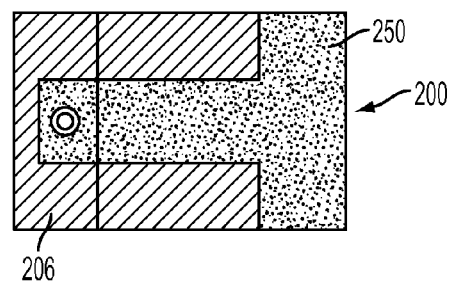

Referring now to FIGS. 6 and 16A-16B, in block 120 a pattern 250 of the cantilever beam 22 (shown in FIG. 1) is defined. Specifically, in one exemplary approach, a photoresist (e.g., SPR 200) may be spun on the layer of oxide 220 using spin coating, and the pattern 250 may be defined using lithography. The SOI wafer 200 may then be heated for several hours. For example, the SOI wafer 200 may be placed in an oven overnight where the SOI wafer 200 experiences elevated temperatures of about 90° C.). The pattern 250 is transferred through the oxide layer 220 by a reactive-ion etching, using for example $CF_4$. Method 100 may then proceed to block 122.

Figure 17A:
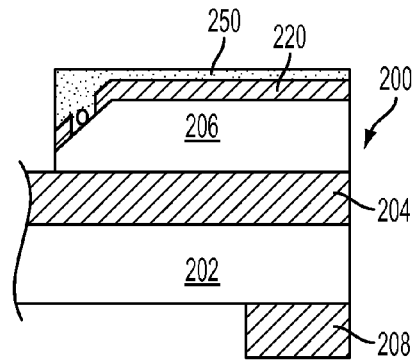
FIGS. 17A-17B are an illustration of etching the cantilever beam, where
Figure 17B:
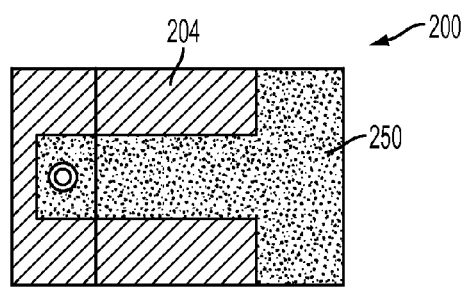

Referring now to FIGS. 6 and 17A-17B, in block 122 the pattern 250 is etched through the device layer 206 using an etching process such as, for example, deep reactive-ion etching (DRIE). Etching stops on the BOX layer 204. This defines the cantilever beam 22. Method 100 may then proceed to block 124.

Figure 18A:
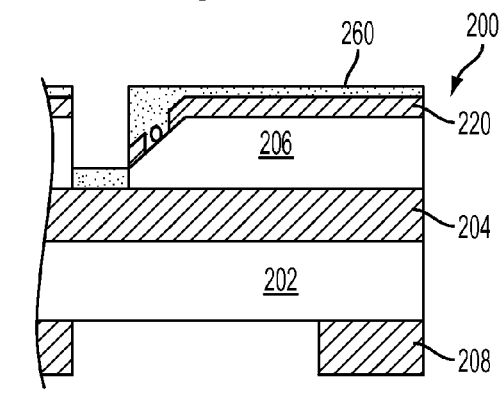
FIGS. 18A-18B are an illustration of the SOI wafer after a layer of photoresist added, where
Figure 18B:
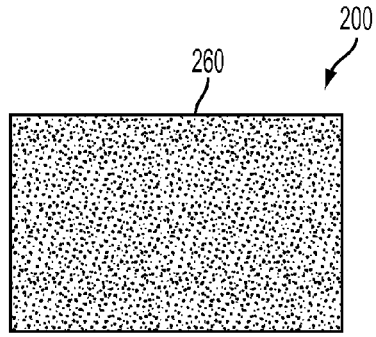

Referring now to FIGS. 6 and 18A-18B, in block 124 another layer of photoresist 260 is placed on the top surface of the wafer principally composed of layers 204 and 220, without removing the pattern 250 (shown in FIGS. 17A-17B). For example, in one approach, the layer of photoresist 260 is spun on (FIG. 17B) using spin coating. The SOI wafer 200 may then be placed in an oven and baked overnight (where the SOI wafer 200 experiences elevated temperatures of about 90° C.), to ensure that substantially all of the solvent is removed from the layer of photoresist 260. Method 100 may then proceed to block 128.

Figure 19:
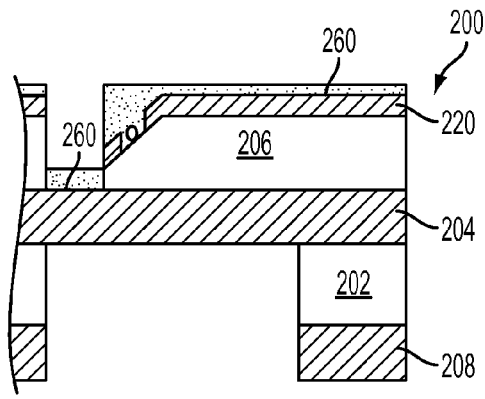
FIG. 19 is an illustration of the handling port of the SOI wafer being further defined by removing a portion of a support wafer.

Referring now to FIGS. 6 and 19, in block 126 the handling port 20 (shown in FIG. 1) is further defined by removing a portion of the support wafer layer 202 using an etching process such as, for example, DRIE. The etching will stop at the BOX layer 204. The layer of photoresist 260 acts as a mechanical support to the BOX layer 204 during etching. Method 100 may then proceed to block 128.

Figure 20:
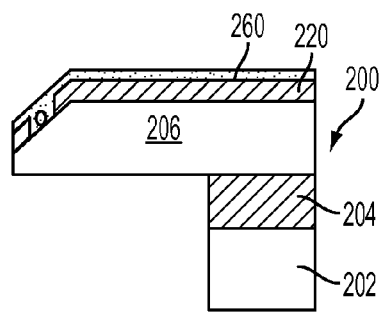
FIG. 20 is an illustration of the handling port of the SOI wafer being further defined by removing a portion of a buried oxide (BOX) layer.

Referring now to FIGS. 6 and 20, in block 128 the handling port 20 (shown in FIG. 1) is further defined by removing a portion of the BOX layer 204. This step also typically removes layer 208. Specifically, for example, the BOX layer 204 may be removed by placing the SOI wafer 200 in hydrofluoric acid. Method 100 may then proceed to block 130.

Figure 21A:
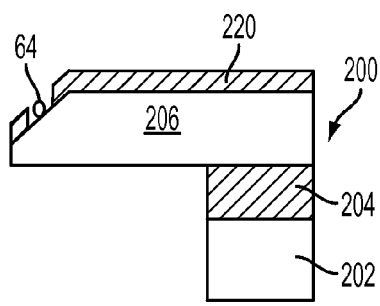
FIGS. 21A-21B are an illustration of the SOI wafer after the photoresist layers are removed, where
Figure 21B:
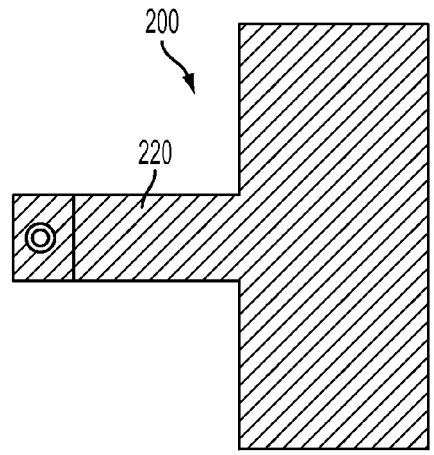

Referring now to FIGS. 6 and 21A-21B, in block 130 the photoresist layers (e.g., pattern 250 and the layer of photoresist 260) are removed. For example, in one approach, the SOI wafer 200 is placed in organic solvent to remove the photoresist layers. This combined with the previous step releases the cantilever 22. Method 100 may then proceed to block 132.

Figure 22A:
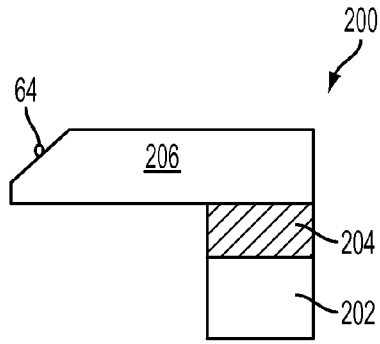
FIGS. 22A-22B are an illustration of the SOI wafer after the layer of oxide is removed, where
Figure 22B:
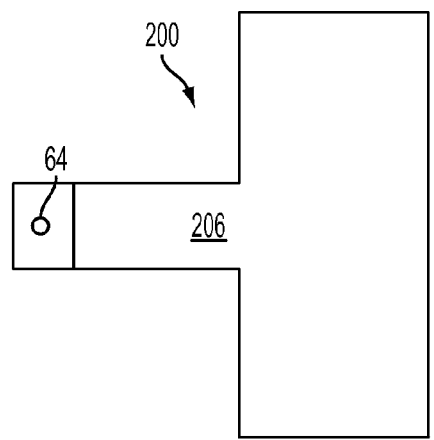

Referring now to FIGS. 6 and 22A-22B, in block 132 the layer of oxide 220 is removed. For example, in one approach the layer of oxide 220 may be removed by placing the SOI wafer 200 in a solution of hydrofluoric acid. It should be noted that in some embodiments, the layer of oxide 220 may also be removed after growing the nanowire as well (e.g., which is discussed in block 134), depending on specific process conditions. Method 100 may then proceed to block 134.

Figure 23:
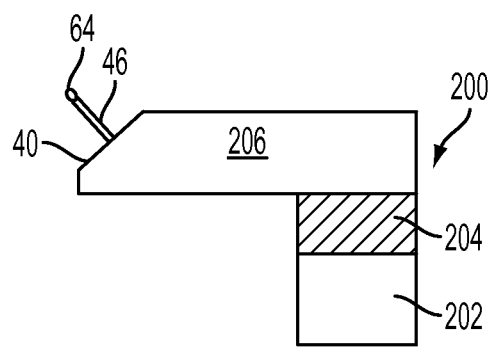
FIG. 23 is an illustration of a nanowire grown along the crystal facet surface of the SOI wafer.

Referring now to FIGS. 6 and 23, in block 134 the nanowire 46 (e.g., the tip) is epitaxially grown along the crystal facet face 40. For example, in one approach employing the VLS mechanism, the tip 46 is grown by placing the catalyst dot 64 in a CVD chamber (not shown), and annealing the catalyst dot 64 for a predetermined amount of time (e.g., generally between about 5 and 15 minutes). Then, a precursor such as, for example, silicon tetrachloride ($SiCl_4$), silane ($SiH_4$) or disilane ($Si_2H_6$) may be introduced into the CVD chamber. The CVD chamber may then be pressurized, where the tip 46 may nucleate and grow for a predetermined amount of time (e.g., generally between about 10 to about 30 minutes). The SOI wafer 200 may then be removed from the CVD chamber and allowed to cool under vacuum. Method 100 may then proceed to block 136.

Figure 24A:
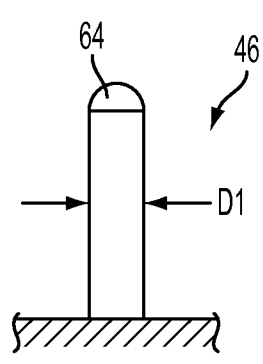
FIGS. 24A-24B are an illustration of the nanowire shown in FIG. 23 being thinned.
Figure 24B:
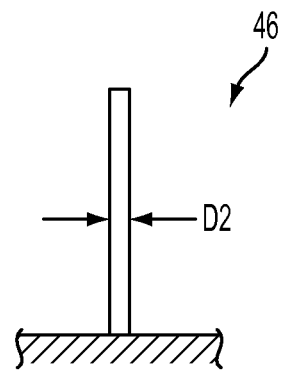

Referring now to FIGS. 6 and 24A-24B, in block 136 the tip 46 is thinned from the first diameter D1 to the second diameter D2. First, the catalyst dot 64 positioned on a distal end 70 of the tip 46 is removed. In one approach, the dot 64 is removed by a liquid etch solution that is capable of etching the metal catalyst, but not the material that the tip 46 is constructed from. Thinning may be achieved by an oxidation process followed by vapor hydrofluoric etching, or by any isotropic or anisotropic etch suitable for the material that the tip 46 is constructed from. Method 100 may then terminate.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of creating a probe for scanned probe microscopy, comprising:
   providing a wafer having a support wafer layer and a device layer;
   masking the wafer with a masking layer;
   removing a portion of the masking layer at the device layer;
   etching the wafer along the portion of the masking layer that has been removed to create a crystal facet surface that is oriented at a tilt angle; and
   epitaxially growing a tip along the crystal facet surface.

2. The method of claim 1, comprising creating a metal catalyst dot along the crystal facet surface before epitaxially growing the tip.

3. The method of claim 2, wherein the metal catalyst is selected from the group consisting of: metal catalyst may include, but are not limited to, gold (Au), aluminum (Al), palladium (Pd), titanium (Ti), nickel (Ni), silver (Ag), copper (Cu), iron (Fe), gallium (Ga), indium (In) platinum (Pt), and zinc (Zn).

4. The method of claim 2, wherein the metal catalyst dot is located positioned on a distal end of the tip after epitaxial growth.

5. The method of claim 4, comprising removing the metal catalyst dot by a liquid etch solution configured to only etch the metal catalyst dot.

6. The method of claim 5, comprising thinning the tip from a first diameter to a second diameter, wherein the second diameter is less than the first diameter.

7. The method of claim 6, comprising thinning the tip by an oxidization process combined with vapor hydrofluoric etching.

8. The method of claim 6, comprising thinning the tip by one of an isotropic etch and an anisotropic etch.

9. The method of claim 1, wherein the tip is epitaxially grown using one of a vapor-liquid-solid (VLS) mechanism and a vapor-solid-solid (VSS) mechanism.

10. The method of claim 1, comprising epitaxially growing the tip in a direction generally orthogonal to the crystal facet surface.

11. The method of claim 1, wherein the tilt angle is based on a tilt correction factor, wherein the tilt correction factor is based on an angled position of the cantilever beam in a scanned probe microscopy machine.

12. The method of claim 1, wherein the portion of the masking layer at the device layer is removed using reactive-ion etching (RIE).

13. The method of claim 1, wherein etching the wafer along the portion of the masking layer that has been removed is performed by placing the wafer in one of a potassium hydroxide (KOH) solution and a tetramethylammonium hydroxide (TMAH) solution.

14. The method of claim 1, comprising etching through the device layer to define a cantilever beam of the probe.

15. The method of claim 1, wherein the crystal facet surface is selected from a group comprising: a {111} crystalline plane, a {100} crystalline plane, a {112} plane, and a {110} crystalline plane.

* * * * *